United States Patent [19]

Vanroye

[11] Patent Number: 5,148,897

[45] Date of Patent: Sep. 22, 1992

[54] PISTON VALVING FOR SHOCK ABSORBERS

[75] Inventor: Bert E. Vanroye, Borgloon, Belgium

[73] Assignee: Monroe Auto Equipment Company, Monroe, Mich.

[21] Appl. No.: 732,498

[22] Filed: Jul. 18, 1991

[51] Int. Cl.⁵ .............................................. F16F 9/34
[52] U.S. Cl. ........................... 188/322.22; 188/322.15; 188/320; 188/282
[58] Field of Search .......... 188/282, 281, 280, 322.22, 188/322.15, 317, 320, 315; 267/124, 140.1 AE, 140.1 A, 219; 137/513.5, 493.8, 512.1, 493, 512.15, 860, 517

[56] References Cited

U.S. PATENT DOCUMENTS

| | | | |
|---|---|---|---|
| 1,028,400 | 6/1912 | Stanton | 188/320 |
| 2,320,697 | 6/1943 | Binder . | |
| 2,327,295 | 8/1943 | Whisler, Jr. | 188/280 |
| 2,637,414 | 5/1953 | Patriquin | 188/322.22 X |
| 2,646,859 | 7/1953 | Read et al. | 188/315 |
| 2,732,039 | 1/1956 | Funkhouser et al. | 188/282 |
| 2,740,500 | 4/1956 | Brundrett et al. | 188/322.15 |
| 2,800,981 | 7/1957 | Allinquant | 188/322.15 |
| 3,007,550 | 11/1961 | Long, Jr. | 188/322.15 X |
| 3,134,460 | 5/1964 | DeCarbon | 188/322.15 X |
| 3,180,453 | 4/1965 | Murata . | |
| 3,199,638 | 8/1965 | Otomo . | |
| 3,232,390 | 2/1966 | Chano . | |
| 3,365,033 | 1/1968 | Willich . | |
| 3,561,575 | 2/1971 | Allinquant | 188/322.15 X |
| 3,706,362 | 12/1972 | Faure | 188/320 |
| 3,756,357 | 9/1973 | Graff et al. | 188/317 X |
| 3,882,977 | 5/1975 | Watanabe . | |
| 4,054,277 | 10/1977 | Sirven . | |
| 4,203,507 | 5/1980 | Tomita et al. | 188/282 X |
| 4,356,898 | 11/1982 | Guzder et al. . | |
| 4,401,196 | 8/1983 | Grundei . | |
| 4,407,396 | 10/1983 | Sirven . | |
| 4,423,801 | 1/1984 | Miura . | |
| 4,457,409 | 7/1984 | Fukushima et al. . | |
| 4,466,514 | 8/1984 | Molders et al. | 188/320 |
| 4,467,899 | 8/1984 | Molders et al. | 188/322.15 X |
| 4,515,252 | 5/1985 | Hidaka et al. | 188/322.15 X |
| 4,610,332 | 9/1986 | Mourray | 188/322.15 |
| 4,615,420 | 10/1986 | Mourray | 188/317 X |
| 4,759,534 | 7/1988 | Härtel | 267/140.1 AE |
| 4,782,925 | 11/1988 | Grundei . | |
| 4,809,828 | 3/1989 | Nakazato | 188/322.15 |
| 4,821,852 | 4/1989 | Yokoya . | |
| 4,830,152 | 5/1989 | Rauert et al. . | |
| 4,874,066 | 10/1989 | Silberstein . | |
| 4,893,800 | 1/1990 | Tabata | 267/140.1 AE |
| 4,964,493 | 10/1990 | Yamaura et al. . | |
| 5,085,300 | 2/1992 | Kato et al. | 188/317 X |

FOREIGN PATENT DOCUMENTS

| | | | |
|---|---|---|---|
| 1056946 | 5/1959 | Fed. Rep. of Germany | 188/282 |
| 2038984 | 2/1972 | Fed. Rep. of Germany | 188/282 |
| 2751046 | 12/1978 | Fed. Rep. of Germany | 188/282 |
| 1331415 | 5/1962 | France | 137/493.8 |
| 0280943 | 11/1988 | Japan | 267/219 |
| 0278026 | 11/1990 | Japan | 188/322.15 |
| 2147683A | 8/1984 | United Kingdom . | |

Primary Examiner—Douglas C. Butler
Attorney, Agent, or Firm—Harness, Dickey & Pierce

[57] ABSTRACT

A pressure-operated valving arrangement for a piston assembly of the type used in a direct-acting shock absorber is disclosed. Bi-directional primary and secondary flow paths are provided for regulating the damping forces generated during both rebound and compression strokes. During rebound, a pressure differential generated across a moveable valve disc operates to regulate fluid flow from an upper to a lower portion of the shock absorber's working chamber. A pilot orifice in the valve disc and a bleed slot associated with a rebound blow-off assembly are sized to generate the desired pressure differential across the valve disc. Manipulation of the size ratio permits universality of design for economical shock absorber manufacture.

8 Claims, 3 Drawing Sheets

PISTON VALVING FOR SHOCK ABSORBERS

BACKGROUND OF THE INVENTION

The present invention relates generally to suspension systems for motor vehicles and machines which receive mechanical shock and, more particularly, to a piston valving arrangement for use in shock absorbers.

Hydraulic dampers, such as shock absorbers are used in connection with motor vehicle suspension systems to absorb unwanted vibrations which occur during driving. To dampen the unwanted vibrations, shock absorbers are generally connected between the sprung portion (i.e. the vehicle body) and the unsprung portion (i.e. the suspension) of the motor vehicle. A piston assembly is located within the working chamber of the shock absorber and is connected to the body of the motor vehicle through a piston rod. The piston assembly includes a valving arrangement that is able to limit the flow of damping fluid within the working chamber when the shock absorber is compressed or extended. As such, the shock absorber is able to generate a damping force which "smooths" or "dampens" the vibrations transmitted from the suspension to the vehicle body.

The greater the degree to which the flow of damping fluid within the working chamber is restricted across the piston assembly, the greater the damping forces which are generated by the shock absorber. Accordingly, a "soft" compression and rebound stroke is produced when the flow of damping fluid across the piston assembly is relatively unrestricted. In contrast, a "firm" compression and rebound stroke is produced when there is an increased restriction to the flow of damping fluid across the piston assembly.

In selecting the damping characteristics of a shock absorber is to provide, three vehicle performance parameters are generally considered; ride comfort, vehicle handling and road holding ability. Ride comfort is largely a function of the spring constant of the main springs (i.e. coil springs, leaf springs, pneumatic spring, etc.) of the motor vehicle, as well as the spring constant of the seat, tires, and the damping of the shock absorbers. Vehicle handling is related to the variation in the vehicle's attitude (i.e. roll, pitch and yaw). For optimum vehicle handling, relatively large damping forces are required to avoid excessively rapid variation in the vehicle's attitude during high speed maneuvering, cornering, acceleration, and deceleration. Finally, road holding ability is generally a function of the amount of contact between the tires and the ground. To optimize road holding ability, large damping forces are generally required when driving on irregular surfaces to prevent loss of contact between the wheels and the ground for an excessive period of time.

As will be appreciated, a plethora of different piston valving arrangements are currently used in conventional shock absorbers. Such piston valving arrangements typically incorporate a mechanical biasing member, such as a coil spring, for biasing a flow restricting valve member so as to regulate the flow of damping fluid through a uni-directional flow path interconnecting upper and lower portions of the working chamber. While conventional piston valving arrangements generally perform satisfactorily, there is a continuing desire to reduce their complexity and cost while concomitantly maintaining the desired performance and service life characteristics. In addition, in many heavy-duty shock absorber applications, the excessively large forces generated during both the rebound and compression stroke are a design constraint in that complex hydro-mechanical valving arrangements are generally required for generating the desired damping characteristics. More particularly, many heavy-duty shock absorbers utilize a plurality of relatively thick deflectable blow-off discs or valve plates which are mechanically biased to insure adequate flow regulation in view of the large damping forces to be generated. In addition, most conventional valving arrangements incorporate independent uni-directional flow paths for regulating flow during each of the distinct rebound and compression strokes.

SUMMARY OF THE INVENTION

Accordingly, it is a primary object of the present invention to provide a simplified piston valving arrangement for use in direct acting telescopic shock absorbers. More specifically, the present invention is directed to a pressure-operated piston valving arrangement which overcomes the various disadvantages associated with conventional hydro-mechanical valving arrangements by generating a fluid pressure differential across a moveable valve member for regulating the flow of hydraulic fluid between the upper and lower portions of the shock absorber's working chamber. In addition, the magnitude of the pressure differential produced across the valve member can be selectively manipulated for permitting the piston valve designer to easily "tune" the piston valving arrangement for any prescribed suspension application.

Another object of the present invention is to provide a pressure-operated piston valving arrangement for a shock absorber in which the damping force generated during the rebound and compression strokes may be manipulated. More particularly, by selecting a desired size ratio between a pilot orifice formed in the valve member and a by-pass bleed slot provided in fluid communication with the pilot orifice and the lower portion of the working chamber, the pressure differential across the valve member is produced. As such, the piston valving arrangement of the present invention includes means for controllably bleeding (i.e. by-passing) damping fluid between the upper portion and lower portions of the working chamber for maintaining the pressure differential across the valve member while concurrently regulating the "blow-off" force acting on a rebound blow-off assembly.

A further object of the present invention is to provide a shock absorber having a pressure-operated piston valving arrangement in which the flow of damping fluid is bi-directional through a single common flow path during both the rebound and compression strokes.

It is a further object of the present invention to provide a new and improved shock absorber piston valving arrangement which is of a relatively simple design, is economical to manufacture, and will have a long and effective operational life.

Various other objects, features and advantages of the present invention will become apparent from the following detailed description taken in conjunction with the accompanying drawings and the appended claims.

DETAILED DESCRIPTION OF THE PREFERRED EMBODIMENT

Figure 1:
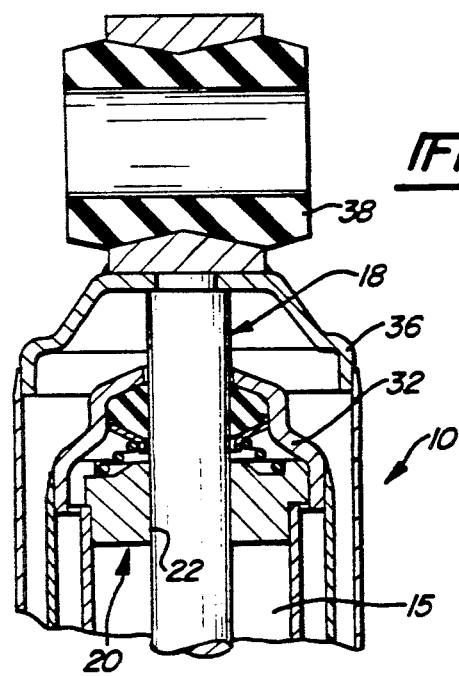
FIG. 1 is a longitudinal cross-sectional view of a shock absorber incorporating a piston assembly having

With reference now to the drawings and, in particular, to FIG. 1, a direct acting hydraulic actuator or shock absorber 10 is shown to include an elongated tubular pressure cylinder 12 provided for defining a hydraulic fluid containing working chamber 14. It is to be understood, that the construction of shock absorber 10 is merely exemplary in nature and is only intended to illustrate one type of hydraulic damping apparatus within which the pressure-operated piston arrangement of the present invention can be readily utilized.

Disposed within working chamber 14 is a reciprocable piston assembly 16 that is secured to one end of an axially extending piston rod 18. Piston rod 18 is supported and guided for movement within pressure cylinder 12 by means of a combination seal and rod guide assembly 20 located in an upper end of pressure cylinder 12 and having a central axially extending bore 22 through which piston rod 18 is reciprocally movable. Disposed between piston assembly 16 and pressure cylinder 12 is a TEFLON (trademark) sleeve 23 which is used to facilitate movement of piston assembly 16 with respect to pressure cylinder 12.

A base valve assembly, generally designated at 24, is located within a lower end of pressure cylinder 12 and functions to control the flow of hydraulic fluid between working chamber 14 and a fluid reservoir 26. Fluid reservoir 26 is defined as the space between the outer peripheral surface of pressure cylinder 12 and the inner peripheral surface of a tubular reserve tube 28 which is concentrically arranged around the exterior of pressure cylinder 12. A helical baffle (not shown) made be operably located within fluid reservoir 26 for controlling aeration of the hydraulic fluid transferred between fluid reservoir 26 and working chamber 14.

The upper and lower ends of shock absorber 10 are provided with generally cup-shaped upper and lower end of caps 32 and 34, respectively, which are secured, as by welding, to the opposite ends of reserve tube 28. Shock absorber 10 is shown as including a tubular dirt shield 36 which is secured at its upper end to an upper end of piston rod 18. In addition, suitable end fittings 38 are secured to the upper end of piston rod 18 and lower end cap 34 for operatively securing shock absorber 10 between the sprung and unsprung portions of the motor vehicle. As will be appreciated by those skilled in the art, upon reciprocal movement of piston rod 18 and piston assembly 16, hydraulic fluid within working chamber 14 will be transferred between an upper portion 15 and a lower portion 17 of working chamber 14 as well as between working chamber 14 and fluid reservoir 26 (via base valve 24) for damping relative movement between the sprung portion and the unsprung portion of the motor vehicle.

Figure 2:
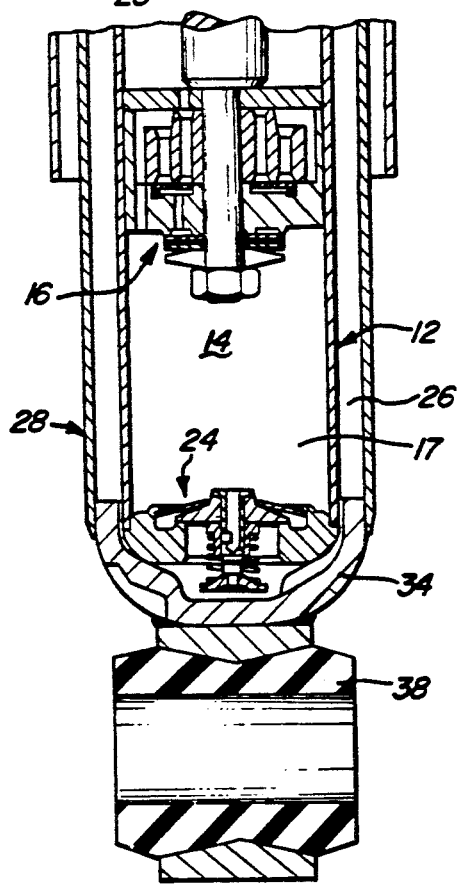
FIG. 2 is an enlarged cross-sectional view of a portion of the piston assembly shown in FIG. 1.
Figure 2:
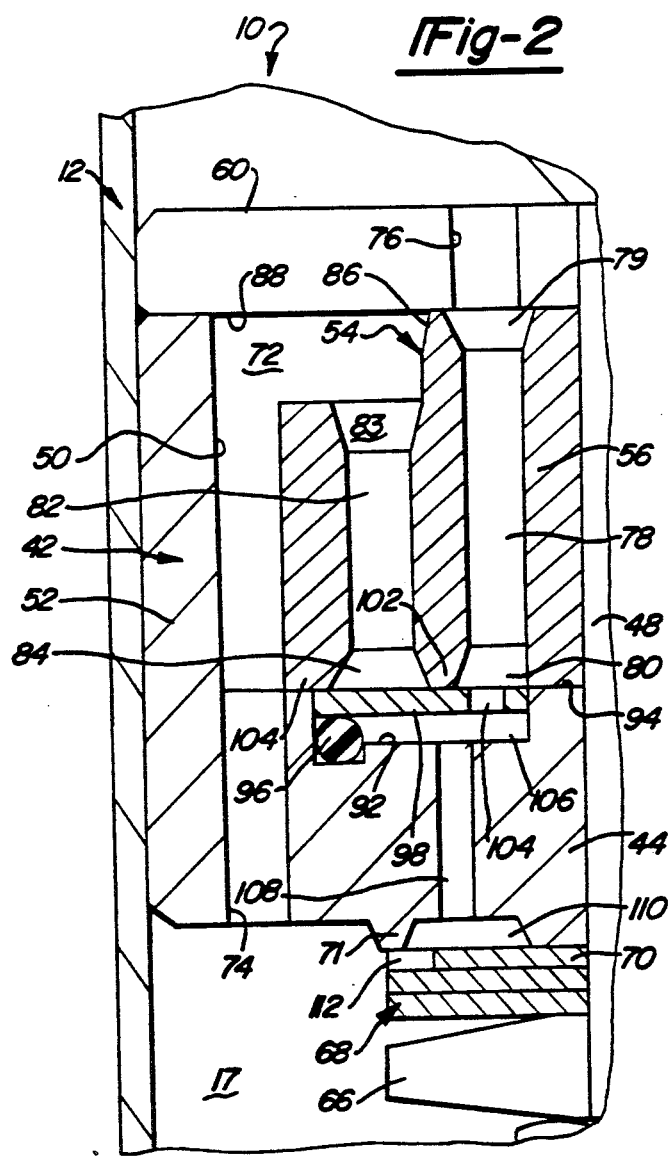
Figure 3:
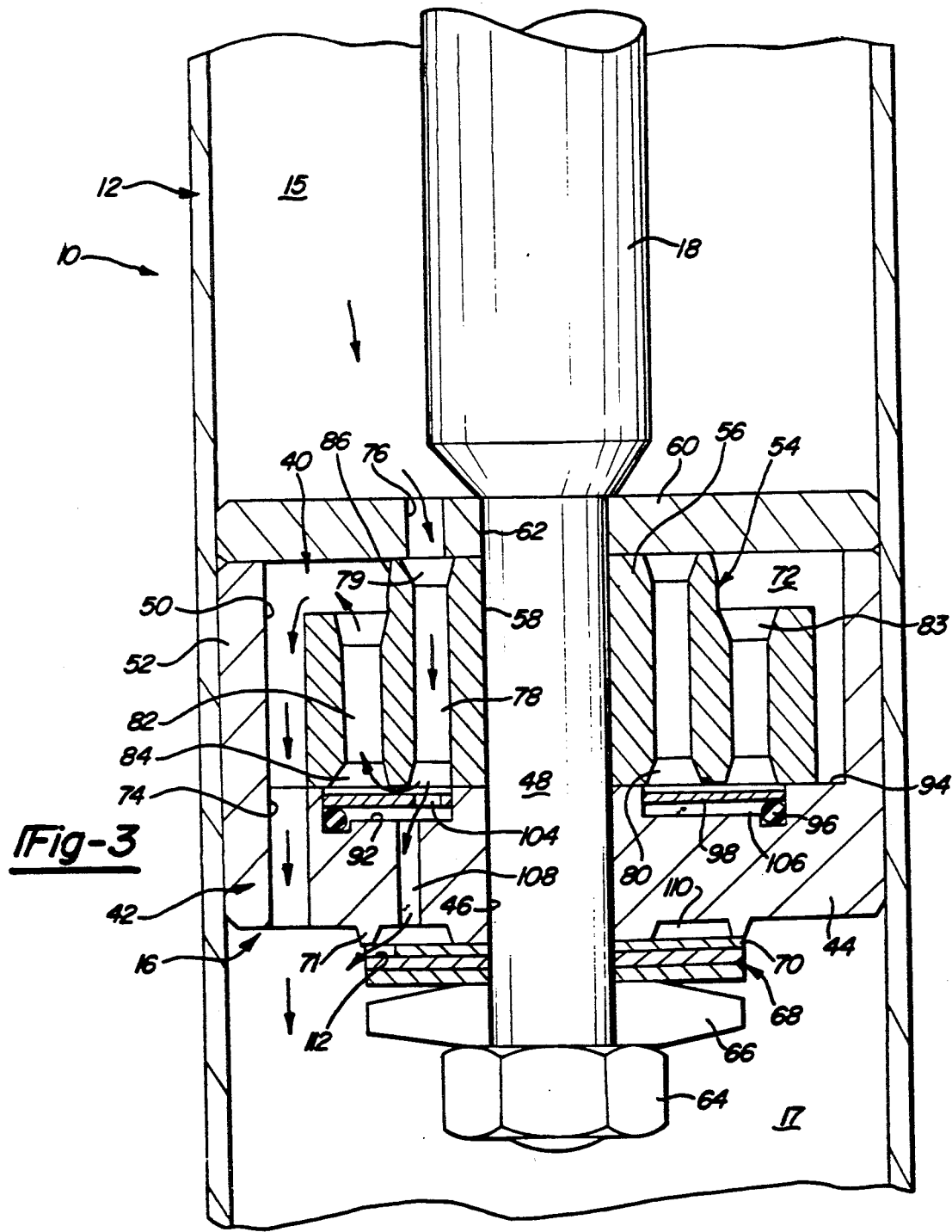
FIG. 3 is an enlarged cross-sectional view of the piston assembly shown in FIG. 1 illustrating the primary and secondary flow paths through the piston valving arrangement during a rebound stroke.
Figure 4:
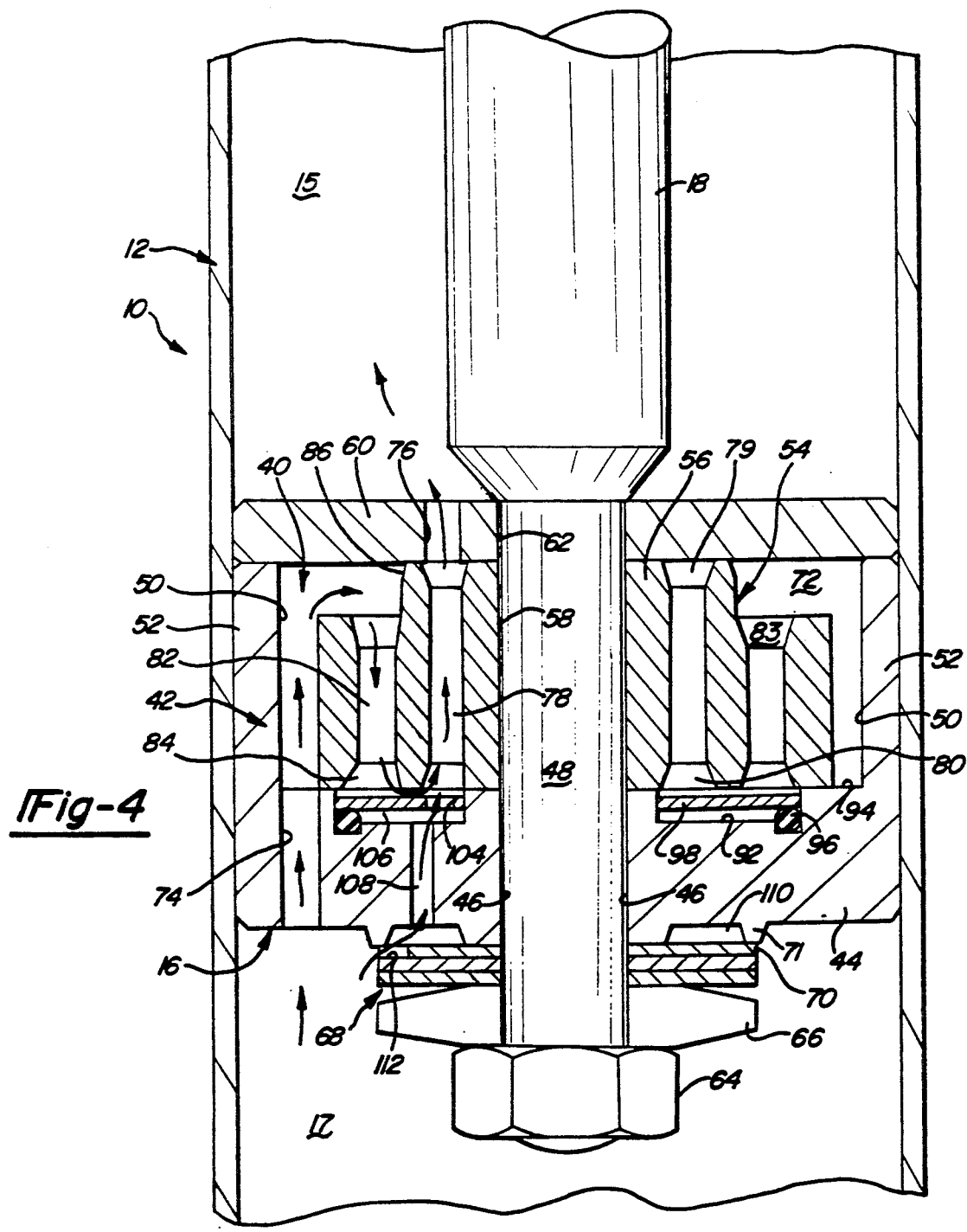
FIG. 4 is an enlarged cross-sectional view of the piston assembly shown in FIG. 1 illustrating the primary and secondary flow paths through the piston valving arrangement during a compression stroke.

With reference to FIGS. 2 through 4, piston assembly 16 is shown to include a new and improved pressure-operated valving arrangement 40 that is operable for selectively controlling the bi-directional flow of hydraulic damping fluid through a primary flow path between upper and lower portions 15 and 17, respectively, of working chamber 14 during reciprocal movement of piston assembly 16. In general, pressure-operated valving arrangement 40 is well-suited for use in a heavy-duty shock absorber for damping the relatively high forces generated during the rebound stroke so as to maintain optimum road holding ability and vehicle handling requirements. Furthermore, pressure-operated valving arrangement 40 is configured to be substantially less complicated as compared to conventional hydro-mechanical valving arrangements. In addition, pressure-operated valving arrangement 40 is constructed to provide common primary and secondary flow paths for regulating flow during both the compression and rebound strokes of shock absorber 10. Moreover, pressure-operated valving arrangement 40 is constructed to generate distinct flow restrictions and, in turn, damping characteristic for the compression and rebound strokes.

As best seen in FIGS. 3 and 4, piston assembly 16 includes a generally cylindrically-shaped piston body 42 having a radially extending lower portion 44 that is formed with a central axially extending bore 46 within which a reduced diameter end portion 48 of piston rod 18 is received. The upper portion of piston body 42 is formed with an enlarged diameter recess or counterbore 50 defined by cylindrical side wall portion 52 and radial lower portion 44. An annular valve body 54 is supported within counterbore 50 and includes a central axially elongated portion 56 having a central bore 58 through which reduced portion 48 of piston rod 18 also extends.

A cover plate 60 hermetically encloses valve body 54 within enlarged counterbore 50 and also includes a central axially extending bore 62 through which reduced diameter end portion 48 of piston rod 18 extends. A threaded piston nut 64, or a similar type fastening element, is threadably received upon end portion 48 to retain piston body 42, valve body 54 and cover plate 60 on piston rod 18. A lock washer 66 is provided intermediate piston nut 64 and a blow-off valve disc pack 68 shown to include one or more yieldable valve discs that are concentrically supported around end portion 48 of piston rod 18. Piston nut 64 and lock washer 66 are operable for biasing a deflectable radially outer portion of an upper valve disc, hereinafter bleed valve disc 70, against an annular valve seat 71 formed on an underside surface of radially extending lower portion 44 of piston body 42. In addition, piston nut 64 and lock washer 66 are also adapted to fixedly retain or secure the inner radial portion of each of the yieldable valve discs of blow-off valve disc pack 68 against axial or deflectable movement. As such, blow-off valve disc pack 68 is adapted to provide a preselected yieldable resistance that defines the "blow-off" characteristics of shock absorber 10 and which can be selectively controlled by varying the number of yieldable valve discs and/or their thickness and material.

With particular reference to FIG. 2, piston assembly 16 is shown in a substantially static condition with piston body 42 shown to include a first set (one shown) of axially extending and circumferentially spaced first bores 74. First bores 74 provide fluid communication between lower portion 17 of working chamber 14 and an annular fluid cavity 72 defined by the space between the outer peripheral surface of valve body 54 and counter bore 50. Similarly, cover plate 60 is formed with a second set (one shown) of axially extending and circumferentially spaced second bores 76. In general, piston valving arrangement 40 is configured to provide bi-direction primary and secondary (by-pass) flow paths between the first set of first bores 74 and the second set of second bores 76. More particularly, valve body 54 includes a first axially extending annular flow passage 78 formed in central portion 56 thereof that has an upper recessed channel 79 in fluid communication with the second set of second bores 76 formed in cover plate 60. Moreover, first annular flow passage 78 terminates in a lower recessed channel that defines a first annular pressure chamber 80.

Valve body 54 also defines a second axially extending annular flow passage 82 which is located radially outward of and concentric to first annular flow passage 78. Second annular flow passage 82 has an upper recessed channel 83 in fluid communication with fluid cavity 72 and a lower recessed channel that defines a second annular pressure chamber 84. As will be described hereinafter, pressure-operated valve means are provided for regulating the flow of damping fluid between first and second pressure chambers 80 and 84, respectively. In addition, elongated axial portion 56 of valve body 54 defines an annular valve seat 86, adjacent upper recessed channel 79, which sealingly engages an underside surface 88 of cover plate 60 for inhibiting direct fluid communication between second bores 76 and annular fluid cavity 72. As such, the "primary" or main bi-directional flow path across piston assembly 16 includes first bores 74, fluid cavity 72, upper recessed channel 83, second flow passage 82, second pressure chamber 84, first pressure chamber 80, first flow passage 78, upper recessed channel 79 and second bores 76.

In accordance with the present invention, piston valving arrangement 40 includes pressure-operated valve means for regulating the flow of fluid between first and second pressure chambers 80 and 84, respectively and, in turn, between upper and lower portions 15 and 17, respectively, of working chamber 14. In particular, a recessed annular channel 92 is formed in an upper surface 94 of radial portion 44 of piston body 42. A resilient seal member, such as O-ring 96, and a pressure-operated valve disc 98 are disposed within annular channel 92. In the static (i.e. pressure equalized) condition shown in FIG. 2, O-ring 96 is adapted to normally support and bias valve disc 98 into engagement with first and second valve seats 100 and 102, respectively, formed on valve body 54. In this position, valve disc 98 is adapted to inhibit fluid communication between first and second pressure chambers 80 and 84, respectively.

With continued reference to FIGS. 2 through 4, one or more axially extending by-pass or pilot orifices 104 are shown extending through valve disc 98 for providing fluid communication between first pressure chamber 80 and an annular pilot pressure chamber 106, defined as the space below valve disc 98 within annular channel 92. Pilot pressure chamber 106 is in fluid communication with one or more (one shown) axially extending pilot bores 108 formed in piston body 42 for providing fluid communication between pilot pressure chamber 106 and a blow-off chamber 110. As seen, the fluid pressure within blow-off chamber 110 acts directly upon bleed valve disc 70. Furthermore, bleed valve disc 70 includes a bleed slot 112 along its peripheral edge for permitting a limited quantity of fluid to flow between upper and lower portions 15 and 17, respectively, of working chamber 14 via first bores 76, upper recessed channel 79, first flow passage 78, first pressure chamber 80, pilot orifice 104, pilot chamber 106, pilot bore 108, blow-off chamber 110 and bleed slot 112. In this manner, the secondary or "pilot" bi-directional flow path between upper and lower portions 15 and 17, respectively, of working chamber 14 is provided, the function of which will be described herebelow.

In general, the present invention is directed to pressure-operated piston valving arrangement 40 which is particularly well-suited for use in a heavy-duty shock absorber and that is operable for producing different damping characteristics in each of the rebound and compression strokes. With particular reference to FIG. 3, the flow characteristics associated with generating the desired damping characteristic during a rebound stroke will now be described. During rebound, the main or primary flow path permits damping fluid in upper portion 15 of working chamber 14 to flow through first bores 76, upper channel 79, first flow passage 78 and into first pressure chamber 80. According to the preferred embodiment, the cross-sectional area of pilot orifice 104 is greater than that of bleed slot 112 whereby a "back-up" or pilot pressure is produced in pilot pressure chamber 106.

Piston valving arrangement 40 is configured such that the pilot pressure within pilot chamber 106 acts on a larger surface area on the lower surface of valve disc 98 than the fluid pressure acting on the upper surface of valve disc 98 within first pressure chamber 80. As will be appreciated, during upward travel of piston assembly 16 in pressure cylinder 12 damping fluid is displaced from upper portion 15 of working chamber 14 into first flow passage 78 and first pressure chamber 80. In accordance with this invention, during rebound, the fluid pressure acting on the upper surface of valve disc 98 within first pressure chamber 80 is sufficiently greater than the pilot pressure acting on the lower surface of valve disc 98 within pilot pressure chamber 106 for causing valve disc 98 to be axially displaced downwardly in proportion to the pressure difference developed.

Once valve disc 98 has been axially displaced from valve seats 102 and 104, damping fluid is allowed to flow from upper portion 15, through second bores 76, into recessed channel 79 and first flow passage 78, to first pressure chamber 80, around first valve seat 102, into second pressure chamber 84, through second flow passage 82 and upper recessed channel 83, and into fluid cavity 72 from where it is delivered through first bores 74 to lower portion 17 of working chamber 14. Concomitantly, the secondary or "pilot" by-pass flow path delivers fluid from first pressure chamber 80 through pilot orifice 104 into pilot pressure chamber 106, which is delivered through pilot bores 108 into blow-off chamber 110 from where it exits bleed slot 112 into lower portion 17 of working chamber 14.

Due to the preselected size ratio of the cross-sectional areas of pilot orifice 104 with respect to bleed slot 112, the desired pilot pressure is generated in pilot pressure chamber 106 simultaneously with a blow-off pressure being produced in blow-off chamber 110. Despite the relatively limited amount of fluid being bled or drained from blow-off chamber 110, once the fluid pressure in blow-off chamber 110 exceed a predefined maximum level, the fluid pressure in blow-off chamber 110 causes blow-off disc pack 68 to yieldably deflect away from valve seat 71 to permit additional fluid to flow into lower portion 17. This in turn, acts to "soften" the damping characteristics for limiting the progressively increasing damping forces generated during rebound at a desired level.

During rebound, the pressure differential acting on valve disc 98 between first pressure chamber 80 and pilot pressure chamber 106 causes valve disc 98 to be axially displaced away from valve seats 102 and 104 in proportion thereto, whereby the fluid flowing through the primary flow path will experience a pressure drop upon flowing from first pressure chamber 80 to second pressure chamber 84 for generating a relatively large damping force. Therefore, blow-off of fluid from blow-off chamber 110 causes a corresponding reduction in the pilot pressure in pilot chamber 106 which, in turn, permits increased flow from first pressure chamber 80 into second pressure chamber 84 for generating the "softened" damping characteristic.

As will be appreciated, selectively modifying the dimensional ratios between pilot orifice 104 and bleed slot 112, as well as between first pressure chamber 80 and pilot pressure chamber 106, will create a predictable pressure differential acting across valve disc 98. In this manner, the desired damping forces generated can be easily manipulated. Likewise, by selectably varying the dimensional and/or material characteristics of the deflectable valve members used in blow-off disc pack 68, the valve designer is able to control the blow-off characteristics for any particular suspension application.

With reference now to FIG. 4, the primary and secondary flow paths through piston valving arrangement 40 during a compression stroke are clearly shown. In general, flow of damping fluid through the primary and secondary flow paths is reversed from that described with reference to the rebound stroke shown in FIG. 3. However, piston valving arrangement 40 does not include "blow-off" capabilities for the compression stroke since a relatively soft damping force is normally generated. In particular, since bleed slot 112 is smaller than pilot orifice 104, the fluid pressure acting on valve disc 98 within pilot pressure chamber 106 is relatively low compared to that acting on valve disc 98 within second pressure chamber 84. As such, a relatively large pressure differential is produced across valve disc 98 for causing valve disc 98 to be displaced downwardly away from first and second valve seats 102 and 104, respectively, for permitting relatively unrestricted fluid flow and, in turn, a soft compression force.

Therefore, the present invention provides a new and improved shock absorber piston assembly construction wherein the magnitude of fluid flow, and hence the magnitude of shock absorber damping, is achieved through use of varying orifice sizes for providing a relatively universal piston valving arrangement. By virtue of the fact that the construction and orifice sizing may be easily varied, numerous modified application of shock absorber 10 may be made without excessive cost for redundant tooling, inventory, assembly or the like.

The foregoing discussion discloses and describes an exemplary embodiment of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A piston assembly disposed for reciprocal movement in a working chamber of a shock absorber and dividing said working chamber into an upper portion and a lower portion, said piston assembly comprising:
    a piston body connected to one end of a piston rod and having a recessed upper portion defining an enlarged counterbore;
    an annular valve body disposed within said counterbore and having a central bore through which said piston rod extends;
    cover means for sealingly enclosing said annular valve body within said counterbore for defining a fluid cavity therebetween;
    first flow bore means extending through said piston body for providing fluid communication between said lower portion of said working chamber and said fluid cavity;
    second flow bore means extending through said cover means for providing fluid communication between said upper portion of said working chamber and a first annular flow passage formed in said valve body;
    a first pressure chamber formed in said valve body in fluid communication with said first flow passage;
    a second annular flow passage formed in said valve body in fluid communication with said fluid cavity;
    a second pressure chamber formed in said valve body in fluid communication with said second flow passage;
    a third annular pressure chamber formed in said piston body;
    pressure-operated valve means disposed in said third pressure chamber and operable for regulating flow of damping fluid from said first flow passage to said second flow passage during a rebound stroke in response to a first pressure differential between said first and third pressure chambers, and said pressure-operated valve means operable for regulating flow of damping fluid from said second flow passage to said first flow passage during a compression stroke in response to a second pressure differential between said second and third pressure chambers; and
    bypass means for selectively by-passing damping fluid between said upper and lower portions of said working chamber for generating said first and second pressure differentials.

2. The piston assembly of claim 1 wherein said pressure-operated valve means is a valve disc resiliently supported in said third pressure chamber and moveable with respect to valve seat means formed on said valve body for controllably restricting the flow of damping fluid between said first and second pressure chambers.

3. The piston assembly of claim 2 wherein said bypass means is operable for generating a relatively large second pressure differential between said second and third pressure chambers such that said valve disc is displaced away from said valve seat means in response thereto for generating a relatively soft damping characteristic during said compression stroke.

4. The piston assembly of claim 2 wherein said bypass means is operable for generating a relatively small first pressure differential between said first and third pressure chambers such that said valve disc is displaced away from said valve seat means in response thereto for generating a relatively firm damping characteristic during said rebound stroke.

5. The piston assembly of claim 4 wherein said by-pass means includes a pilot orifice formed through said valve disc for permitting fluid communication between said first and third pressure chambers, and bleed flow means formed in said valve body for providing fluid communication between said third pressure chamber and said lower portion of said working chamber so as to define a by-pass flow path between said upper and lower portions of said working chamber, and wherein the cross-sectional area of said pilot orifice being of a predetermined ratio with respect to the cross-sectional area of said bleed flow means for causing said relatively small first pressure differential across said valve disc during said rebound stroke and said relatively large second pressure differential across said valve disc during said compression stroke.

6. The piston assembly of claim 5 further comprising rebound blow-off valve means for permitting increased flow through said by-pass flow path during a rebound stroke so as to concomitantly increase the magnitude of said first pressure differential, whereby increased damping fluid is permitted to flow from said upper portion into said lower portion of said working chamber for softening the damping characteristic.

7. The piston assembly of claim 6 wherein said rebound blow-off valve means is a deflectable valve member, and wherein said bleed flow means includes a fourth pressure chamber in fluid communication with said third fluid chamber and a bleed slot formed in said deflectable valve member.

8. The piston assembly of claim 7 wherein fluid pressure within said fourth pressure chamber acts on said deflectable valve member for causing said valve member to yieldably deflect when said fluid pressure within said fourth pressure chamber exceeds a predetermined maximum value, whereby additional fluid is by-passed to said lower portion of said working chamber.

* * * * *